(12) United States Patent
Omlor et al.

(10) Patent No.: US 12,033,343 B2
(45) Date of Patent: Jul. 9, 2024

(54) STEREOSCOPY METHOD AND STEREOSCOPY APPARATUS

(71) Applicant: Carl Zeiss Microscopy GmbH, Jena (DE)

(72) Inventors: Lars Omlor, Pleasanton, CA (US); Timo Stich, Jena (DE); Christian Dietrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 323 days.

(21) Appl. No.: 17/689,022

(22) Filed: Mar. 8, 2022

(65) Prior Publication Data

US 2022/0292704 A1   Sep. 15, 2022

(30) Foreign Application Priority Data

Mar. 10, 2021 (DE) .................... 10 2021 105 795.7

(51) Int. Cl.
*G06T 7/593* (2017.01)
*H04N 13/271* (2018.01)

(52) U.S. Cl.
CPC .......... *G06T 7/593* (2017.01); *H04N 13/271* (2018.05); *G06T 2207/10012* (2013.01); *G06T 2207/20212* (2013.01)

(58) Field of Classification Search
CPC .......... G06T 7/593; G06T 2207/10012; H04N 13/204; H04N 13/271; H04N 2013/0081; G02B 21/22
See application file for complete search history.

(56) References Cited

U.S. PATENT DOCUMENTS

| 2013/0287293 A1* | 10/2013 | Genc ............... G06T 7/593 382/154 |
| 2013/0329015 A1 | 12/2013 | Pulli et al. |
| 2018/0122092 A1* | 5/2018 | Stoppe ............. G06T 5/73 |
| 2018/0217600 A1 | 8/2018 | Shashua et al. |
| 2021/0026126 A1* | 1/2021 | Husemann ......... G02B 21/365 |

FOREIGN PATENT DOCUMENTS

| AT | 517656 A1 * | 3/2017 | ......... G01B 11/245 |
| AT | 517656 A1 | 3/2017 | |
| DE | 102013210153 A1 | 2/2014 | |

OTHER PUBLICATIONS

Search Report for Application No. DE 10 2021 105 795.7, (no English translation available), Jan. 18, 2022, 8 pages.

* cited by examiner

*Primary Examiner* — Jayanti K Patel
*Assistant Examiner* — Christopher Kingsbury Glover
(74) *Attorney, Agent, or Firm* — LaBatt, LLC

(57) ABSTRACT

Stereoscopy in which at least one image of a scene is recorded from a first viewing angle, and at least one image of the scene is recorded from a second viewing angle. The scene is recorded multiple times from the first viewing angle. A first combination image is obtained from the various images recorded from the first viewing angle, said combination image according to the stipulation of a comparison algorithm having smaller differences in relation to at least one image also recorded from the second viewing angle or smaller differences in relation to a second combination image obtained from the images from the second viewing angle than each individual image recorded from the first viewing angle. An image of the scene with the depth information is obtained from the first combination image and at least one image from the second viewing angle or the second combination image.

19 Claims, 2 Drawing Sheets

STEREOSCOPY METHOD AND STEREOSCOPY APPARATUS

REFERENCE TO RELATED APPLICATIONS

The current application claims the benefit of German Patent Application No. 10 2021 105 795.7, filed on 10 Mar. 2021, which is hereby incorporated by reference.

FIELD OF THE DISCLOSURE

The invention relates to a stereoscopy method according to the preamble of Claim 1 and a stereoscopy apparatus according to the preamble of Claim 14.

BACKGROUND OF THE DISCLOSURE

Numerous variants of generic methods and apparatuses are known.

The following method steps are carried out in a generic stereoscopy method: at least one image of a scene is recorded from a first viewing angle, at least one image of the scene is recorded from a second viewing angle which differs from the first viewing angle, and an image of the scene with depth information is obtained from the images of the scene recorded from the first viewing angle and the second viewing angle.

A generic stereoscopy apparatus comprises the following components: at least one optical arrangement for recording images of a scene from a first viewing angle and for recording images of the scene from a second viewing angle which differs from the first viewing angle, at least one light source for illuminating the scene, and a control and evaluation unit for evaluating images of the scene recorded from the first viewing angle and the second viewing angle.

Both stereo metrology and methods of structured illumination are known per se. The plurality of methods with illumination manipulation are aimed at direct triangulation by way of the illumination, for example by means of a projector and a camera.

One of the most significant problems in passive stereoscopy is the identification of matching points in the various projection images, that is to say in the images recorded from different viewing angles.

A usual assumption in this context is that the image contents of the two views correspond. However, in fact this is usually not the case because the surfaces in the two views have different angle relationships relative to the camera and to the illumination.

This effect could be avoided using diffuse all-round illumination. In principle, the same color and intensity values would be obtained in the views in the process, also in relation to reflection sites, which are likewise problems for stereoscopy. However, it requires much effort to provide diffuse all-round illumination.

SUMMARY OF THE DISCLOSURE

An object of the invention can be considered that of specifying a stereoscopy method and a stereoscopy apparatus which are distinguished by improved image results while requiring an acceptable amount of effort.

This object is achieved by the method having the features of Claim 1 and by the apparatus having the features of Claim 14.

Advantageous variants of the method according to the invention and preferred exemplary embodiments of the apparatus according to the invention are described below, in particular in conjunction with the dependent claims and the figures.

The method of the aforementioned type is developed in that the scene is recorded multiple times from the first viewing angle, in that a first combination image is obtained from the various images recorded from the first viewing angle, said combination image according to the stipulation of a comparison algorithm having smaller differences in relation to at least one image recorded from the second viewing angle or smaller differences in relation to a second combination image obtained from the images from the second viewing angle than each individual image recorded from the first viewing angle, and in that the image of the scene with the depth information is obtained from the first combination image and at least one image from the second viewing angle or the second combination image.

The apparatus of the aforementioned type is developed in that the control and evaluation unit is configured to obtain a first combination image from various images recorded from the first viewing angle, in particular with a different illumination situation in each case, said combination image according to the stipulation of a comparison algorithm having smaller differences in relation to at least one image recorded from the second viewing angle or in relation to a second combination image obtained from the images from the second viewing angle than each individual image recorded from the first viewing angle, and to obtain the image of the scene with the depth information from the first combination image and at least one image from the second viewing angle or the second combination image.

The invention has initially recognized that the identification of the same points in stereo pairs is made significantly more difficult by image differences. These differences are very frequently caused by reflection differences, in particular reflections or Lambertian intensity differences, on the observed surfaces.

What can be considered to be a substantial advantage of the invention is that the generation of images of a scene with depth information is improved without requiring the comparatively significant effort for a diffuse all-round illumination.

The term stereoscopy denotes methods in which a scene is observed or recorded from at least two different viewing angles and an image with depth information, that is to say a three-dimensional image, is subsequently obtained from the two views.

In this case a scene denotes a three-dimensional arrangement of objects, of which a three-dimensional image is intended to be obtained.

Optical arrangement, first optical arrangement and second optical arrangement for recording images denote all optical means required in each case for obtaining two-dimensional images of a scene. These means may contain one or more of the following components: lenses, mirrors, spectral filters, stops, diffusing plates, cameras. Such optical means are known per se.

For the purposes of the present description, the terms first viewing angle and second viewing angle should be understood to mean the spatial orientation of the arrangement used to obtain a two-dimensional image of the scene. By way of example, this spatial orientation may be specified in a coordinate system that is stationary relative to the scene.

As a rule, the term image is understood to mean a two-dimensional image within the present description. Only the image with the depth information, to be obtained according to the invention, is a three-dimensional image.

In principle, any radiation source that provides the electromagnetic radiation in the desired spectral range and at the desired intensity can be used as a light source for illuminating the scene. The components to be used in the process, such as gas discharge lamps, LED sources, incandescent lamps, are known.

The control and evaluation unit for evaluating images of the scene recorded from the first viewing angle and the second viewing angle denotes a computing unit which comprises the hardware and software means that are required in order to be able to carry out the image processing according to the invention.

The term first combination image denotes an image which is generated by way of the control and evaluation unit, which belongs to the first viewing angle and which is obtained from a plurality of images that are in fact recorded from the first viewing angle.

By way of example, the first combination image can be obtained by linear combination of the images obtained from the first viewing angle.

The term second combination image denotes an image which is generated by way of the control and evaluation unit, which belongs to the second viewing angle and which is obtained from a plurality of images that are in fact recorded from the second viewing angle.

The term comparison algorithm denotes a mathematical operation which assigns a similarity value or a measure of similarity to two images according to a certain calculation rule. Such comparison algorithms are known in various forms in image processing.

In preferred variants of the method according to the invention, the comparison algorithm will assess the similarity of images using correlation algorithms. By way of example, the correlation of two images can be used as a measure of the similarity of said images.

The illumination situation of a scene is defined by the totality of the utilized light sources, the spatial positioning thereof relative to the scene and the set intensity thereof. Consequently, different illumination situations are distinguished in that at least one of the parameters of number of light sources, spatial positioning of a light source and intensity of a light source is varied.

The stereoscopy apparatus according to the invention is suitable, in particular, to carry out the method according to the invention in all of the variants described herein.

The images from the first viewing angle may be recorded by way of a first optical arrangement and the images from the second viewing angle may be recorded by way of a second optical arrangement.

In principle, the invention is implemented if a plurality of images are recorded from the first viewing angle. In particularly preferred variants of the method according to the invention, an illumination situation of the scene during the various recordings from the first viewing angle is set differently in each case. This improves the possibilities of adapting the first combination image to match the images recorded from the second viewing angle or to match a second combination image.

A further substantial discovery of the invention may be considered to be the fact that it is advantageous to record images with a plurality of illumination settings. If a plurality of illumination settings are available, it is possible to better digitally match the image contents of the right view and the left view.

The invention describes a novel method for the digital generation of images from a plurality of different illumination situations, with the object of matching the image contents in stereo pairs to the best possible extent. This algorithm simplifies the stereo correspondence problem, which needs to be solved in order to generate a three-dimensional (3D) reconstruction of a scene.

The advantages of the invention are already achieved if only one image is recorded from the second viewing angle. Improvements in view of adapting the images from the first viewing angle and the images from the second viewing angle are possible in configurations of the method according to the invention in which the scene is also recorded multiple times from the second viewing angle and a second combination image is obtained from the various images recorded from the second viewing angle, said second combination image according to the stipulation of a comparison algorithm having smaller differences in relation to the first combination image than each individual image recorded from the second viewing angle. In this method variant, the image of the scene with the depth information is obtained from the first combination image and the second combination image.

Particularly preferably, the illumination situation of the scene is also set differently in each case for the various images recorded from the second viewing angle. This can further improve the possibilities of adapting the first combination image to match the images recorded from the second viewing angle or to match a second combination image.

What is essential to the method according to the invention is that a first combination image is determined from the various images recorded from the first viewing angle, said combination image according to the stipulation of a comparison algorithm having smaller differences in relation to at least one image recorded from the second viewing angle or having smaller differences in relation to a second combination image obtained from the images from the second viewing angle than each individual image recorded from the first viewing angle.

Then, the three-dimensional image of the scene, that is to say the image with the depth information, is obtained according to the invention using the first combination image determined according to these criteria and at least one image from the second viewing angle or the second combination image.

In preferred variants of the method according to the invention, use is moreover made of optimization methods whose goal is the determination of a first combination image which is as similar as possible to the images recorded from the second viewing angle or to the second combination image, that is to say which has small differences from these images or from the second combination image.

Such optimization methods are known per se. In a simple case, the first combination image can be determined by a linear regression which attempts to combine the images recorded from the first viewing angle, in such a way that the first combination image is as similar as possible, or even identical, to the images recorded from the second viewing angle or to the second combination image.

The second combination image can also be obtained by linear combination of the images obtained from the second viewing angle. By way of example, the second combination image can be obtained by forming the mean value or median of the images obtained from the second viewing angle.

In variants of the method according to the invention, the first combination image and/or the second combination image are or is sought with the target of a minimization of the sum of squared deviations.

In further preferred variants of the method according to the invention, the first combination image and/or the second combination image are or is obtained using machine learning.

Further preferred configurations of the method according to the invention are characterized in that the different illumination situations are provided by way of one light source or a plurality of light sources for illuminating the scene, said light source or sources being controlled differently depending on the illumination situation. It is also possible to run through sequences of illumination situations in programmed fashion using the control and evaluation unit.

In the apparatus according to the invention, for these purposes preferably one light source can be present or a plurality of light sources can be present for illuminating the scene, said light source or light sources being able to be controlled by way of the control and evaluation unit, and the control and evaluation unit can be configured to control the at least one light source to provide the different illumination situations of the scene, in particular within a programmed sequence.

The method according to the invention and the apparatus according to the invention may be used for all applications in which accurate three-dimensional images of a scene are important. By way of example, the method according to the invention can be utilized in a stereo microscope, in particular for the purposes of collision prevention, that is to say to prevent components of the microscope from damaging the sample that provides the scene.

In the apparatus according to the invention, a single optical arrangement may be utilized for recording the images from the first viewing angle and the second viewing angle. By way of example, a beam path to a camera could be switched from the first viewing angle to the second viewing angle by way of a mirror. Advantageous exemplary embodiments of the stereoscopy apparatus according to the invention are characterized in that a first optical arrangement is present for recording the images of the scene from the first viewing angle and in that a second optical arrangement is present for recording the images of the scene from the second viewing angle. The first optical arrangement and the second optical arrangement may each have a camera. Such arrangements are advantageous in that there is no need to switch back and forth between two beam paths.

BRIEF DESCRIPTION OF THE DRAWINGS

Further advantages and features of the invention are explained below with reference to the attached drawings, in which.

As a rule, identical and equivalent components are denoted by the same reference signs in the figures.

DETAILED DESCRIPTION

Figure 1:
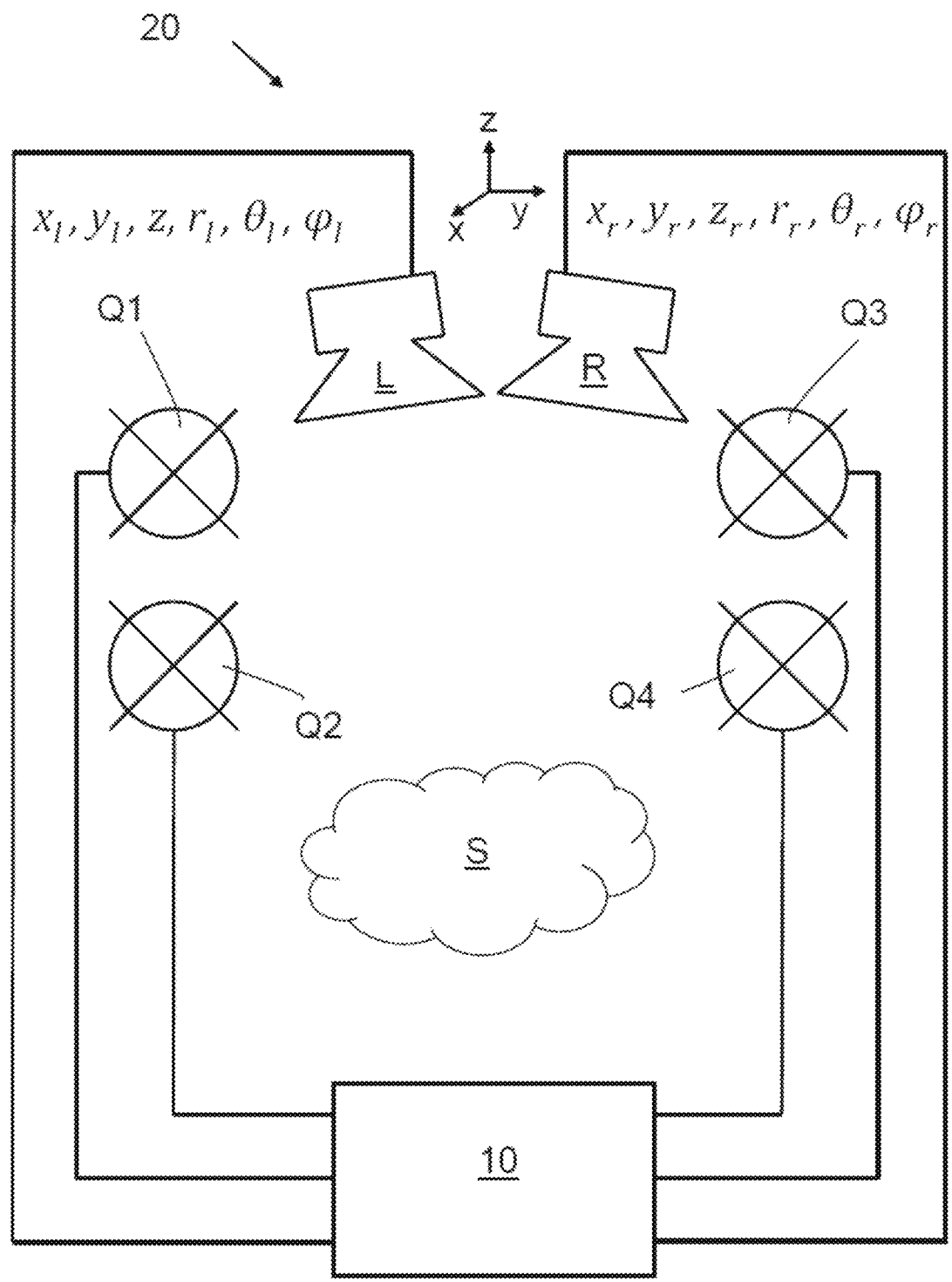
FIG. 1 shows a schematic representation of an apparatus according to the invention and FIG. 2 shows a schematic flow chart for elucidating the essential steps of the method according to the invention.

The exemplary embodiment of a stereoscopy apparatus 20 according to the invention depicted schematically in FIG. 1 firstly has, as essential components, a first optical arrangement L for recording images L1, L2, L3, L4 of a scene S from a first viewing angle and a second optical arrangement R for recording images R1, R2, R3, R4 of the scene S from the second viewing angle. The first optical arrangement L and the second optical arrangement R each have a camera.

The first viewing angle $x_l$, $y_l$, $z_l$, $\theta_l$, $\varphi_l$ and the second viewing angle $x_r$, $y_r$, $z_r$, $\delta_r$, $\varphi_r$ can be specified with reference to a coordinate system x, y, z that is plotted in FIG. 1, with the three spatial coordinates x, y, z of a reference point (not plotted in FIG. 1), a polar angle θ and an azimuth angle φ. The reference point may denote a point on the optical axis of the respective optical arrangement L, R and in the plane of the camera detector. Other mathematical descriptions are possible.

The shown exemplary embodiment of the apparatus 20 additionally has a total of four light sources Q1, Q2, Q3, Q4, which can illuminate the scene S from different directions in each case.

Finally, a control and evaluation unit 10 is present according to the invention, for the purposes of evaluating the images of the scene S recorded from the first viewing angle and the second viewing angle. The control and evaluation unit 10 can be implemented by computing devices known per se, for instance by a PC, a workstation, a laptop or equivalent devices.

According to the invention, the shown exemplary embodiment of the apparatus according to the invention is characterized in that the control and evaluation unit 10 is configured to obtain a first combination image LØ from various images L1, L2, . . . recorded from the first viewing angle with a different illumination situation in each case, said combination image according to the stipulation of a comparison algorithm having smaller differences in relation to at least one image R1, R2, . . . recorded from the second viewing angle or in relation to a second combination image RØ obtained from the images R1, R2, . . . from the second viewing angle than each individual image L1, L2 recorded from the first viewing angle. Moreover, the control and evaluation unit 10 is configured to obtain an image D of the scene S with the depth information from the first combination image LØ and at least one image R1, R2 recorded from the second viewing angle or the second combination image RØ.

Finally, the control and evaluation unit 10 is configured to control the light sources Q1, Q2, Q3, Q4 to provide different illumination situations of the scene S.

Figure 2:
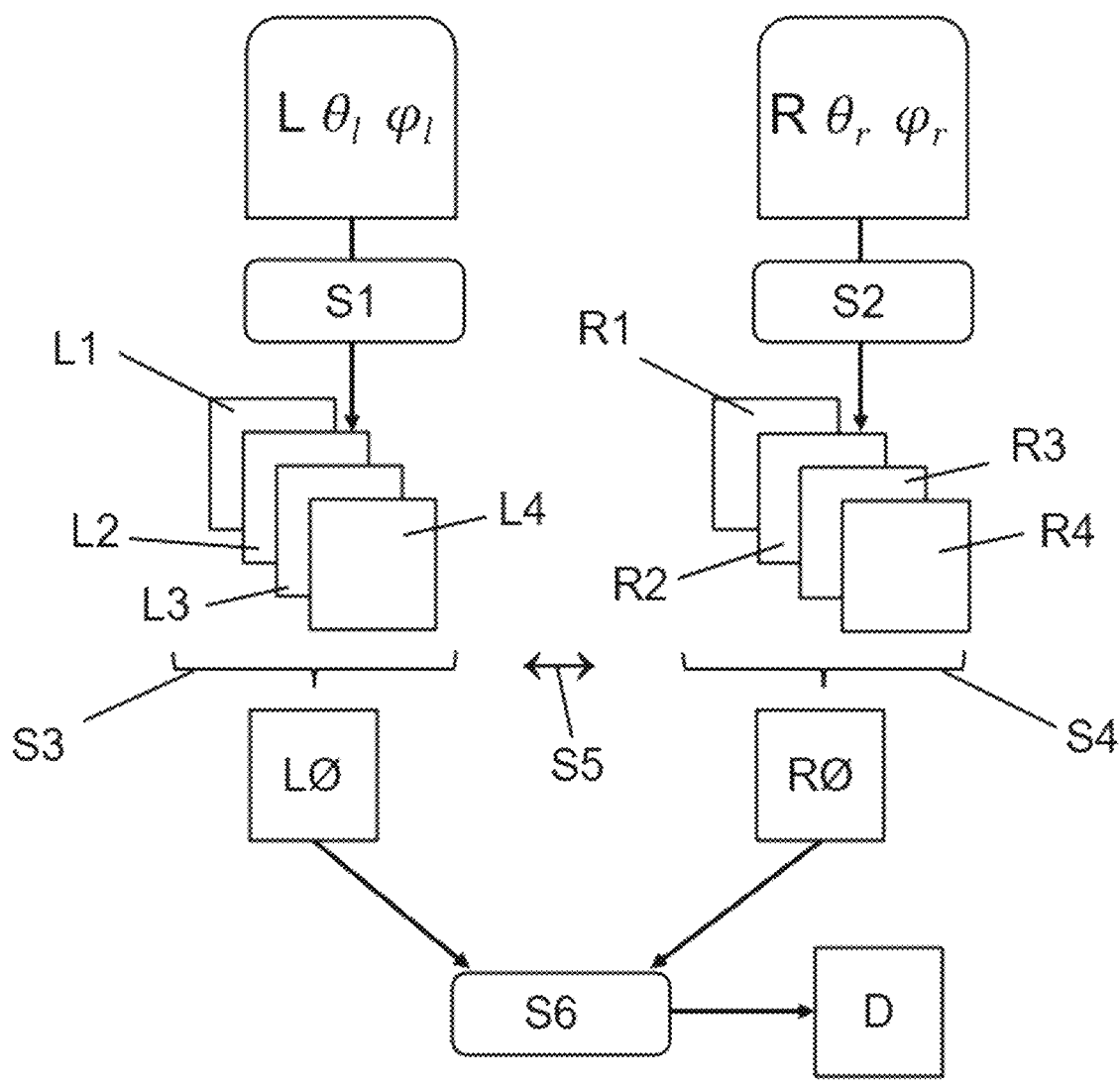

A variant of the spectroscopy method according to the invention is explained with reference to FIG. 2.

As basic steps, a plurality of images L1, L2, L3, L4 of the scene S are recorded from a first viewing angle $\theta_l$, $\varphi_l$ (method step S1) in this variant, with an illumination situation of the scene S during the different recordings from the first viewing angle being set differently in each case with the aid of the light sources Q1, Q2, Q3, Q4.

Moreover, at least one image of the scene is recorded from a second viewing angle $\theta_r$, $\varphi_r$, which differs from the first viewing angle $\theta_l$, $\varphi_l$. In the example elucidated in FIG. 2, the images R1, R2, R3, R4 are recorded from the second viewing angle $\theta_r$, $\varphi_r$ (method step S2). In this case, the illumination situation of the scene S is also set differently in each case for the different images R1, R2, R3, R4.

For the images to be recorded from the first and the second viewing angle, the different illumination situations may be provided by way of the light sources Q1, Q2, Q3, Q4 for illuminating the scene S (FIG. 1), which are controlled differently depending on the illumination situation.

According to the invention, a first combination image LØ is obtained from the various images L1, L2, L3, L4 recorded from the first viewing angle (method step S3). For example, the first combination image LØ can be obtained by linear combination of the images obtained from the first viewing angle.

The first combination image is sought and chosen in such a way that, according to the stipulation of a comparison algorithm, it is more similar to at least one, in particular a plurality or all, of the images R1, R2, R3, R4 of the scene S recorded from the second viewing angle than each individual image L1, L2, L3, L4 recorded from the first viewing angle.

By way of example, the comparison algorithm (method step S5) can assess the similarity of images using correlation algorithms in a manner known per se. For example, the correlation of two images can be used as a measure of the similarity of said images.

In a simple variant, a second combination image RØ is obtained as described (forming the mean value, forming the median, etc.) from the images recorded from the second viewing angle (method step S4) and the first combination image LØ is then sought with the target of a minimization of the sum of squared deviations from the second combination image RØ.

Machine learning methods may also be used to find the first and/or the second combination image.

Finally, the image D of the scene S with depth information is obtained according to the invention from the first combination image LØ obtained thus and at least one image R1, R2, R3, R4 from the second viewing angle (method step S6).

The numbering of method steps S1 to S6 is not related to the temporal sequence of the method steps.

The present invention provides a novel spectroscopy method and a novel spectroscopy apparatus with which the way in which 3D information (depth information) is obtained is improved without much device outlay.

LIST OF REFERENCE SIGNS

10 Control and evaluation unit
20 Apparatus according to the invention
D Image with depth information
L First optical arrangement
L1 Image of the first optical arrangement L
L2 Image of the first optical arrangement L
L3 Image of the first optical arrangement L
L4 Image of the first optical arrangement L
LØ First combination image
Q1 Illumination device
Q2 Illumination device
Q3 Illumination device
Q4 Illumination device
R Second optical arrangement
R1 Image of the second optical arrangement R
R2 Image of the second optical arrangement R
R3 Image of the second optical arrangement R
R4 Image of the second optical arrangement R
RØ Second combination image
S Scene
S1 Method step: Recording a plurality of images
S2 Method step: Recording at least one image
S3 Method step: Obtaining the first combination image LØ
S4 Method step: Obtaining the second combination image RØ
S5 Method step: Comparison algorithm
S6 Method step: Determining the image D with depth information
x, y, z Coordinate system
$x_l, y_l, z_l, \theta_l, \varphi_l$ First viewing angle
$x_r, y_r, z_r, \theta_r, \varphi_r$ Second viewing angle

What is claimed is:

1. Stereoscopy method, comprising:
   recording at least one image of a scene from a first viewing angle,
   recording at least one image of the scene from a second viewing angle which differs from the first viewing angle, and
   obtaining an image of the scene with depth information from the images of the scene recorded from the first viewing angle and the second viewing angle,
   wherein the scene is recorded multiple times from the first viewing angle,
   wherein a first combination image is obtained from the various images recorded from the first viewing angle, said combination image according to the stipulation of a comparison algorithm having smaller differences in relation to at least one image recorded from the second viewing angle or smaller differences in relation to a second combination image obtained from the images from the second viewing angle than each individual image recorded from the first viewing angle, and
   wherein the image of the scene with the depth information is obtained from the first combination image and at least one image from the second viewing angle or the second combination image.

2. Method according to claim 1,
   wherein an illumination situation of the scene during the various recordings from the first viewing angle is set differently in each case.

3. Method according to claim 1,
   wherein the first combination image is obtained by linear combination of the images obtained from the first viewing angle.

4. Method according to claim 1,
   wherein the comparison algorithm assesses the similarity of images using correlation algorithms.

5. Method according to claim 1,
   wherein the correlation of two images is used as a measure of the similarity of said images.

6. Method according to claim 1,
   wherein the scene is also recorded multiple times from the second viewing angle, and
   wherein a second combination image is obtained from the various images recorded from the second viewing angle, said second combination image according to the stipulation of a comparison algorithm having smaller differences in relation to the first combination image than each individual image recorded from the second viewing angle, and
   wherein the image of the scene with the depth information is obtained from the first combination image and the second combination image.

7. Method according to claim 1,
   wherein the second combination image is obtained by linear combination of the images obtained from the second viewing angle.

8. Method according to claim 1,
   wherein the second combination image is obtained by forming the mean value or median of the images obtained from the second viewing angle.

9. Method according to claim 1,
   wherein the first combination image and/or the second combination image are or is obtained using machine learning.

10. Method according to claim 1,
    wherein the first combination image and/or the second combination image are sought with the target of a minimization of the sum of squared deviations.

11. Method according to claim 1,
wherein the illumination situation of the scene is set differently in each case for the various images recorded from the second viewing angle.

12. Method according to claim 1,
wherein the different illumination situations are provided by way of one light source or a plurality of light sources for illuminating the scene, said light source or sources being controlled differently depending on the illumination situation.

13. Method according to claim 1,
which is used in a stereo microscope.

14. Method according to claim 13,
which is used for the purposes of collision prevention.

15. Stereoscopy apparatus, comprising:
at least one optical arrangement for recording images of a scene from a first viewing angle and for recording images of the scene from a second viewing angle which differs from the first viewing angle,
at least one light source for illuminating the scene, and
a control and evaluation unit for evaluating images of the scene recorded from the first viewing angle and the second viewing angle,
wherein the control and evaluation unit is configured
to obtain a first combination image from various images recorded from the first viewing angle, said combination image according to the stipulation of a comparison algorithm having smaller differences in relation to at least one image recorded from the second viewing angle or in relation to a second combination image obtained from the images from the second viewing angle than each individual image recorded from the first viewing angle, and
to obtain the image of the scene with the depth information from the first combination image and at least one image of the second optical arrangement or the second combination image.

16. Stereoscopy apparatus according to claim 15,
wherein the control and evaluation unit is configured
to obtain said first combination image from various images which are recorded from the first viewing angle with a different illumination situation in each case.

17. Stereoscopy apparatus according to claim 15,
wherein one light source is present or a plurality of light sources are present for illuminating the scene, said light source or light sources being able to be controlled by way of the control and evaluation unit, and
in that the control and evaluation unit is configured to control the at least one light source to provide the different illumination situations of the scene.

18. Stereoscopy apparatus according to claim 15,
wherein a first optical arrangement is present for recording the images of the scene from the first viewing angle and
in that a second optical arrangement is present for recording the images of the scene from the second viewing angle.

19. Stereoscopy apparatus according to claim 18,
wherein the first optical arrangement and the second optical arrangement each have a camera.

* * * * *